United States Patent [19]

Amaudric du Chaffaut et al.

[11] 4,050,416
[45] Sept. 27, 1977

[54] SLING DEVICE FOR SUSPENDING ANIMALS OR ARTICLES

[76] Inventors: Patrick Amaudric du Chaffaut, Domaine St Aries; Georges Petrulacci-Stephanopoli, Domaine de l'Etang, both of 84500 Bollene (Vaucluse), France

[21] Appl. No.: 676,422

[22] Filed: Apr. 13, 1976

[30] Foreign Application Priority Data

Apr. 17, 1975 France .............................. 75.12038

[51] Int. Cl.² ........................................... A01K 37/00
[52] U.S. Cl. .................... 119/97 R; 17/44.1; 119/153
[58] Field of Search ............... 119/97, 100, 126–128, 119/153; 17/44.11, 11

[56] References Cited

U.S. PATENT DOCUMENTS 623,612  4/1899  Metzig .............................. 119/153

*Primary Examiner*—Jay N. Eskovitz
*Attorney, Agent, or Firm*—Oblon, Fisher, Spivak, McClelland & Maier

[57] ABSTRACT

A sling device is disclosed for suspending animals, particularly fowl, or articles which have an elongate portion which can be used as the legs of fowl. The sling device comprises a generally C-shaped bracket member with a pivoted lever at one end biased, e.g., by a counterweight, to a rest position. A cord or strap is connected between the other end of the bracket member and a point spaced from the end of the pivoted lever remote from the pivotal mounting of the pivoted lever. In the rest position, the cord is pulled taut under the action of the counterweight. The animal or article is urged against the taut cord, forming a loop therein and moving the points of attachment of the cord relatively towards each other. When the animal or article is released, the weight of the same causes the loop to tighten about the animal or article, ensuring suspension. Alternatively, the end of the cord attached to the bracket member may be attached to another lever pivoted towards the first pivoted lever in the loop forming position. Instead of the counterweight a spring may be used to bias the device to its rest position. The first pivoted lever may be replaced by a movable arm slidable along one leg of the bracket member under the action of a spring.

12 Claims, 7 Drawing Figures

SLING DEVICE FOR SUSPENDING ANIMALS OR ARTICLES

BACKGROUND OF THE INVENTION

The present invention relates to a sling device for holding animals or articles and more particularly to hanging or suspending such animals or articles by the effect of their own weight.

The invention is especially concerned with, though not exclusively, the transportation of fowl, such as chickens, ducks, turkeys or geese, from their coops or where they are raised to pick-up or collector trucks by means of conveyors.

SUMMARY OF THE INVENTION

An object of the invention is to provide a sling device which is suitable for mounting on such conveyors, and more generally on any type of fixed or movable support, and enables the suspension of fowl by their feet in a very quick, simple and secure manner when hanging them up, as well as when taking them down.

Accordingly, a more particular object of the invention consists in a sling device for suspending animals or articles by the effect of their own weight, comprising a bracket member and a cordlike flexible member with one end attached effectively to one end of the bracket member and the other end attached to a movable arm movably mounted at the other end of the bracket member and provided with biasing means pulling the flexible member taut substantially horizontally in the rest position of the device, the movable arm being constructed and arranged so that, when a force is exerted on the flexible member, toward the bracket member the free end of the movable arm describes a path of movement passing proximate to the one end of the bracket member so as to form a loop holding the animal or article by binding it around its part through which the initial force was exerted against the flexible member to form the loop.

The simplicity of the design and operation of the present sling device will be immediately appreciated. In case, for example, a chicken is to be suspended for its transportation, it suffices to bring the legs of the chicken together in a vertical position and against the flexible member until a loop is formed therein about the legs so as to bind the legs of the chicken, which is then held suspended under the force of its own weight.

The chicken is just as easily taken down from the sling device since it suffices to grasp the chicken by its legs and lift it so that the movable arm returns to its initial position, owing to the biasing means acting thereon, thereby undoing the loop, and once again pulling the flexible member taut, totally freeing the legs of the chicken.

BRIEF DESCRIPTION OF THE DRAWINGS

Preferred embodiments of the sling device will now be described, merely by way of example, with reference to the accompanying drawings in which.

DETAILED DESCRIPTION OF THE ILLUSTRATED EMBODIMENTS

Figure 1:
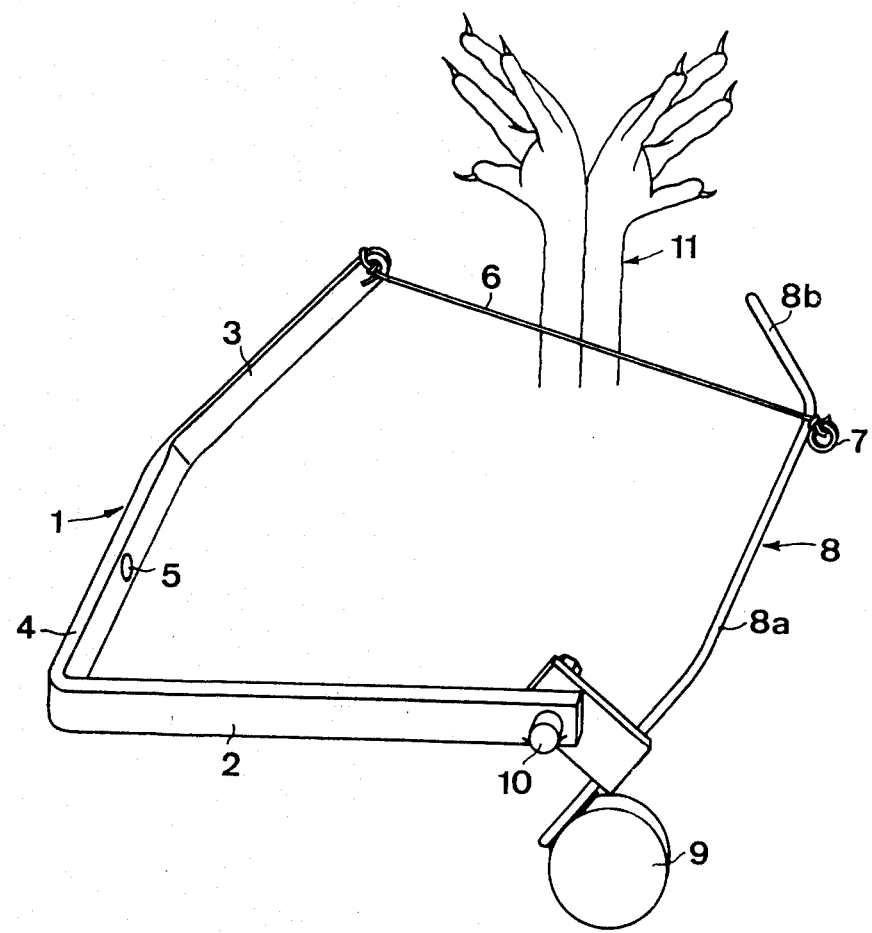
FIG. 1 shows a perspective view of a first embodiment of the present sling device in its rest position.
Figure 2:
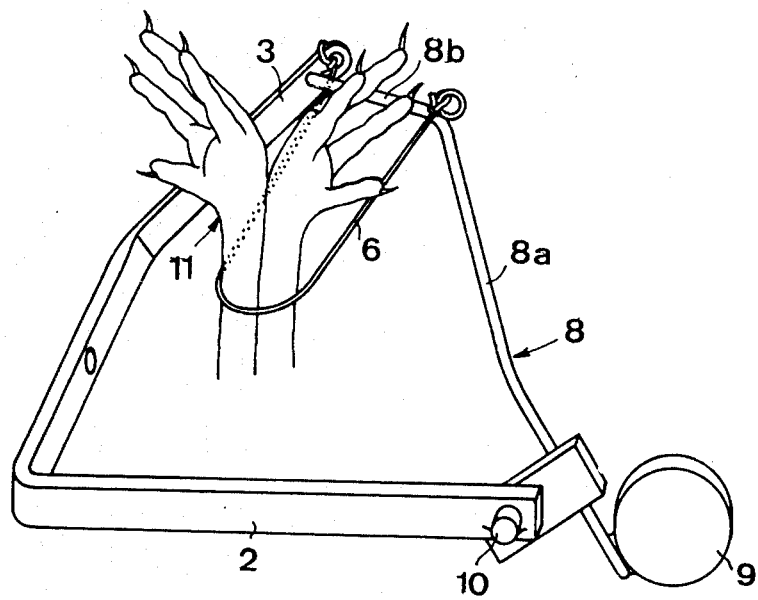
FIG. 2 shows the sling device of FIG. 1 as the legs of a chicken are brought into position.
Figure 3:
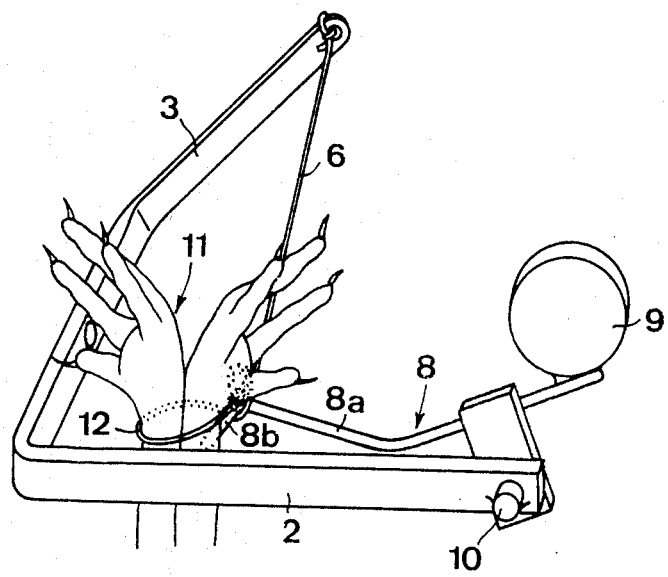
FIG. 3 shows the legs of the chicken bound in the sling device from which it is suspended.

The embodiment of the present sling device shown in FIGS. 1–3 comprises a generally C-shaped bracket member including a horizontal leg 2, an inclined leg angled upwards from a horizontal central portion 4 which has a hole 5 for securing the bracket member at a fixed point or on a movable member, such as a conveyor.

A loopable cordlike flexible member, which here is a cord 6, is attached to the free end of the inclined leg 3 and to a small ring 7 integral with a movable arm, which here is a pivoting lever 8 pivotally mounted at the free end of the horizontal leg 2 of the bracket member. A counterweight 9 acts as means for biasing the pivoted lever 8 in the rest position and is disposed at the lower end of the lever 8, remote from the ring 7. The lever 8 is freely pivotally mounted about a pivot pin 10 fitted on the horizontal leg.

The counterweight 9 is thus disposed so that for all positions of the lever 8 from the rest position (FIG.1) to the operative hanging position (FIG. 3), the counterweight tends to urge the lever 8 toward its rest position.

The lever 8 has a particular configuration. It is bent so that it has a central portion 8a which is thereby adapted to be displaced in a space defined between the horizontal and inclined legs 2 and 3 of the bracket member.

Where the cord 6 is attached to the lever 8, the latter has an end portion 8b bent toward the inclined leg 3. The reason for this special configuration of the lever 8 will be brought out in the description of the operation of the sling device which follows directly.

Let us assume that a chicken is to be suspended, with its head down, from its feet or legs 11. The legs are brought together, as illustrated in FIG. 1. The legs 11 of the chicken are urged against the cord 6 generally towards the interior of the C-shaped bracket member and are initially on the outside of the closed loop defined by the C-shaped bracket member, the taut cord 6, and the lever 8 in its raised position. In this position, i.e., the rest position, the taut cord 6 is substantially horizontal.

FIG. 2 shows the sling device in its intermediate position in which the cord 6 is urged or pulled toward the bracket member 2, and the lever 8 is rotated about the pivot pin 10 so that the bent end portion 8b comes into the immediate proximity of the free end of the inclined leg 3 of the bracket member. The path of movement of the free end of the bent portion 8b passes in the vicinity of the inner face of the inclined leg 3 and above the cord 6 so as to start a loop 12 in the cord which will be tightened about the feet of the chicken at the end of the downward pivotal movement of the lever 8. When the movement is arrested by the tightening of the cord 6 once again, but now under the force of the weight of the chicken, it is thereby efficiently and securely suspended.

The chicken thus suspended cannot come loose, and the heavier its weight the better is the hold of the tightened looped cord 6 thereon.

In order to remove the chicken from the sling device, it is merely necessary to grasp the legs and reverse the above steps. The loop 12 in the cord 6 opens by the raising of the lever 8 due to the action of counterweight 9. Thus the sling device is again in the position illustrated in FIG. 1.

It is extremely easy to adapt the present sling device to a conveyor used for collecting or picking up industrially raised chickens. One merely has to fix such a sling device every x meters along the conveyor belt or chain, the design or construction of the conveyor may easily be adapted to the particular conditions of an operation.

As mentioned above, the sling device may be mounted at a fixed station and be used to suspend an animal or article for a particular operation. It should be noted that several fowl or articles may be suspended from the same sling device.

Figure 4:
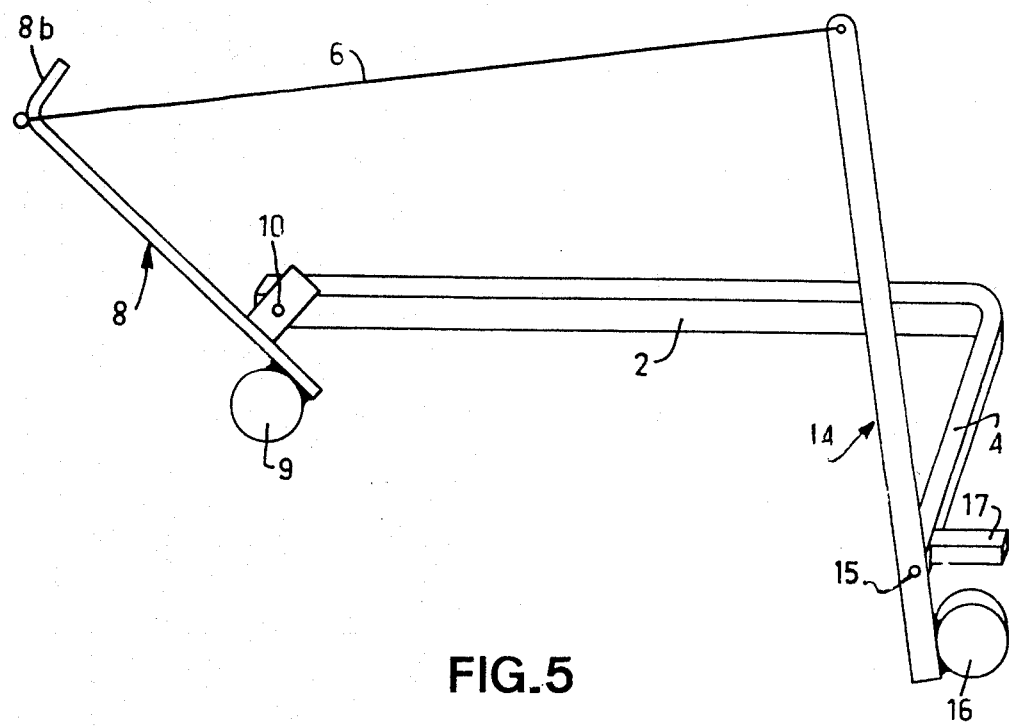
FIGS. 4 and 5 show another embodiment of the sling device in positions corresponding to FIGS. 1 and 2, respectively.
Figure 5:
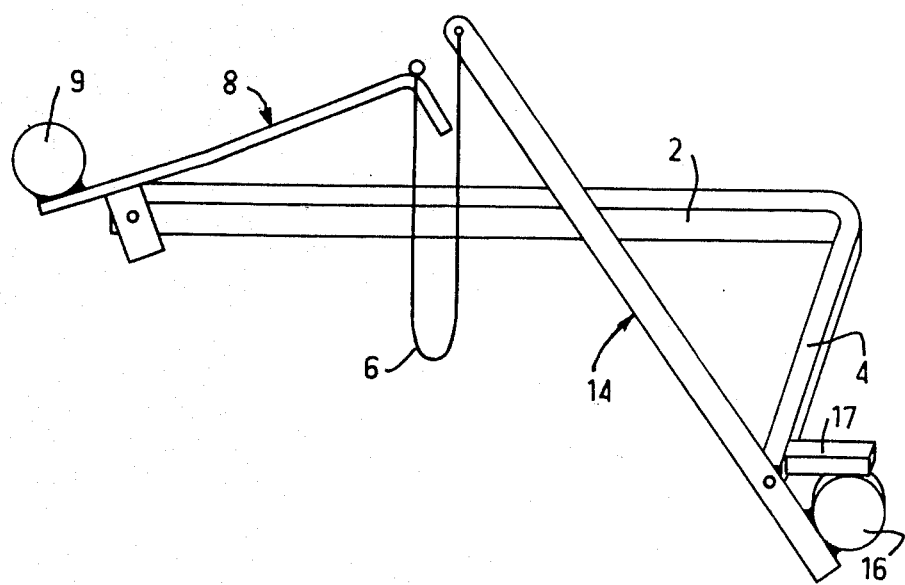

The embodiment of FIGS. 4 and 5 differs from that of FIGS. 1-3 by the fact that the upwardly inclined leg 3 of the bracket member is replaced by a second pivoted lever 14 pivotally mounted at its lower end about a pivot pin 15 extending beyond the horizontal part 4. One end of the cord 6 is fixed to the free end of the lever 14.

A counterweight 16 is fixed at the lower end of the lever 14. A stop 17 is formed integral with part 4 of the bracket member and is adapted to arrest movement of the lever 14 by abutting the counterweight 16 thereby defining the end of the swinging path of movement.

The operation of this embodiment is in all respects analogous to that of the embodiment of FIGS. 1-3.

When the legs of the chicken are urged against the cord 6, the two levers 8 and 14 pivot in opposite directions towards each other (FIG. 5). The FIG. 5 position of this embodiment corresponds to the FIG. 2 position of the previous embodiment. In this position, the lever 14 is in its most inclined orientation relative to the vertical. The binding of the legs of the chicken is tightened when the lever 8 pivots to a position (not shown) corresponding to that of FIG. 3.

Figure 6:
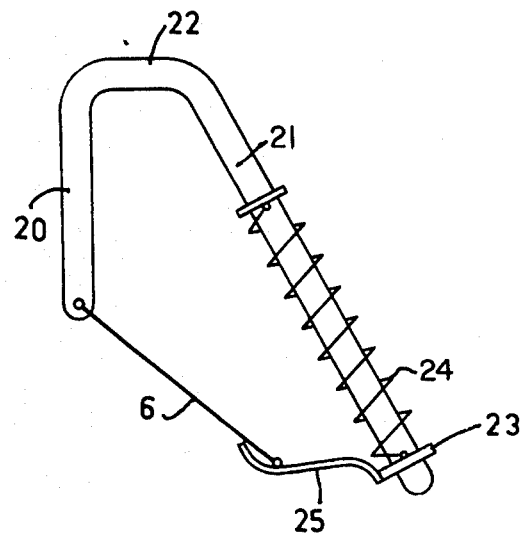
FIGS. 6 and 7 show still another embodiment of the sling device in positions corresponding respectively to FIGS. 1 and 2.
Figure 7:
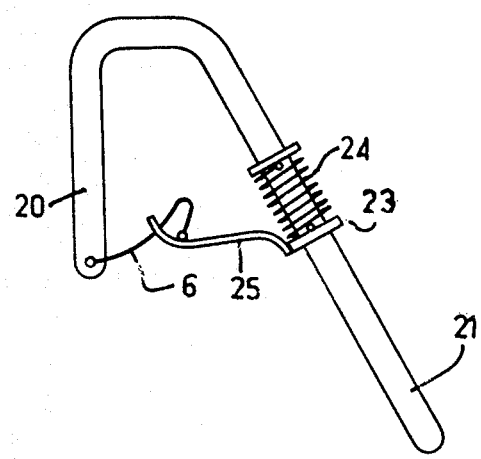

FIGS. 6 and 7 show another embodiment in which the bracket member has two dissymetrical legs 20, 21 disposed in the same plane and joined y an interconnecting central portion 22.

A ring 23 is received on and slidably mounted along the longer leg 21 of the bracket member and urged toward the free end thereof by a coil spring 24, which may be adjustable and is fixed to the longer leg 21 at its end remote from the ring 23. The ring 23 supports a movable arm, the cord 6 being strung between the free end of the leg 20 of the bracket member and the arm 25.

When the legs of the chicken are urged against the cord 6 toward the interior of the bracket member, the coil spring 24 is compressed and a loop is formed in cord 6 and part of the arm 25 (FIG. 7) which binds, for example, the legs of the chicken and holds it as in the previous embodiments.

When the chicken is to be removed, the arm 25 returns to its FIG. 6 position under the action of the biasing means, which here is the return coil spring 24.

Of course the invention is not limited to the foregoing embodiments, but covers all modifications, alternatives and equivalents within the scope of the appended claims. In particular, the bracket member and the movable arm may be of different configurations.

Moreover, the counterweights may be replaced by spring biasing means. With advantage, the counterweights may be adjusted in position on their pivoted levers or mounted removably in order to be able to adjust the biasing force.

Furthermore, the various embodiments may be arranged in pairs, i.e., two such sling devices may be disposed next to each other symmetrically about the leg 2 or the leg 20 so that the operator can work simultaneously a separate sling device with each hand.

The invention is suitable for suspending or transporting all animals or articles having an elongated portion which can be used in the same way as the feet of the chicken described hereinabove.

What we claim is:

1. A sling device for suspending an animal or article comprising a generally C-shaped bracket member, a movable arm, means mounting said movable arm on said bracket member for movement between a rest position and an operative hanging position through an intermediate position, biasing means tending to urge said movable arm toward its rest position, a cordlike flexible member having a first point of attachment effectively connected to said bracket member remote from said movable arm mounting means and a second point of attachment on said movable arm, in said rest position, said biasing means pulling said cordlike flexible member taut with said points of attachment relatively remote from each other, in said intermediate position said points of attachment being brought into relative proximity of each other in response to a part of the animal or article being urged against the flexible member so as to start a loop therein, and in said operative hanging position said points of attachment being once again relative remote from each other owing to the hanging weight of the animal or article on said movable arm, thereby tightening the loop in the cordlike flexible member about said part of the animal or article.

2. A sling device according to claim 1, wherein said second point of attachment is spaced from the end of said movable arm remote from said mounting means thereby defining a portion of the movable arm between said last mentioned end and said second point of attachment which effectively closes the loop in said flexible member in said intermediate position.

3. A sling device according to claim 1, wherein said movable arm is a pivoted lever, said mounting means pivotally mounting said pivoted lever at one end of said bracket member.

4. A sling device according to claim 3, wherein said biasing means comprises a counterweight disposed on said pivoted lever tending to move said second point of attachment of said flexible member on said pivoted lever away from said first point of attachment of said flexile member on said bracket.

5. A sling device according to claim 4, wherein one leg of said C-shaped bracket comprises a lever pivotally secured to the end of the central base part of said bracket remote from said first mentioned mounting means and said first point of attachment is disposed on said pivoted leg.

6. A sling device according to claim 5, wherein other biasing means are associated with said pivoted leg for urging it towards its rest position.

7. A sling device according to claim 6, further comprising a stop for arresting pivotal movement of said pivoted leg between said intermediate position and said operative hanging position of said sling device.

8. A sling device according to claim 7, wherein said pivoted lever and leg pivot in opposite directions of angular movement between said rest and said intermediate positions.

9. A sling device according to claim 2, wherein said bracket member includes a horizontal central portion, a horizontal leg portion to one side of said central portion and an inclined leg portion to the other side thereof, said first point of attachment being disposed proximate to the free end of said inclined leg portion.

10. A sling device according to claim 1, wherein said biasing means is resilient means urging said movable arm towards its rest position thereby pulling said flexible member taut.

11. A sling device according to claim 10, wherein said mounting means slidably mounts said movable arm for slidable movement along a leg of said bracket member.

12. A sling device according to claim 11, wherein said resilient means is a spring coiled round said leg of said bracket member, expanded in its rest position and compressed in its intermediate position.

* * * * *